(12) United States Patent
Huang et al.

(10) Patent No.: US 6,701,150 B1
(45) Date of Patent: Mar. 2, 2004

(54) NETWORK DRIVEN CELL SWITCHING AND HANDOFF WITH LOAD BALANCING FOR WIRELESS SYSTEMS

(75) Inventors: Wei Huang, Nepean (CA); Hang Zhang, Ottawa (CA); Mo-Han Fong, L'Orignal (CA)

(73) Assignee: Nortel Networks Limited, St. Laurent (CA)

( * ) Notice: Subject to any disclaimer, the term of this patent is extended or adjusted under 35 U.S.C. 154(b) by 594 days.

(21) Appl. No.: 09/687,358

(22) Filed: Oct. 13, 2000

(51) Int. Cl.$^7$ .................................. H04Q 7/20
(52) U.S. Cl. ................... 455/439; 455/436; 455/437; 455/438; 455/442; 455/452.2; 455/453; 370/331; 370/332
(58) Field of Search ................. 455/436, 437, 438, 439, 442, 452.2, 453, 450; 370/331, 332, 333

(56) References Cited

U.S. PATENT DOCUMENTS

| | | | | |
|---|---|---|---|---|
| 3,747,114 A | | 7/1973 | Shyhalla ...................... 343/795 |
| 4,652,888 A | | 3/1987 | Deasy ........................... 343/791 |
| 4,670,899 A | * | 6/1987 | Brody et al. ................. 455/453 |
| 5,042,082 A | * | 8/1991 | Dahlin .......................... 455/437 |
| 5,262,793 A | | 11/1993 | Sperry .......................... 343/713 |
| 5,754,541 A | * | 5/1998 | Glisic et al. ................. 370/335 |
| 5,760,749 A | | 6/1998 | Minowa et al. ............. 343/772 |
| 5,794,138 A | | 8/1998 | Briskman .................... 455/344 |
| 5,952,980 A | | 9/1999 | Boling ......................... 343/766 |
| 6,002,933 A | * | 12/1999 | Bender et al. ............... 455/442 |
| 6,041,235 A | * | 3/2000 | Aalto ........................... 455/437 |
| 6,125,278 A | * | 9/2000 | Wieczorek et al. ......... 455/437 |
| 6,278,882 B1 | * | 8/2001 | Choi ............................ 455/453 |
| 6,317,600 B1 | * | 11/2001 | Salonaho et al. ........... 455/453 |
| 6,327,472 B1 | * | 12/2001 | Westroos et al. ........... 455/450 |
| 6,363,252 B1 | * | 3/2002 | Hamalainen et al. ....... 455/436 |
| 6,542,742 B2 | * | 4/2003 | Schramm et al. ........... 455/436 |
| 6,574,474 B1 | * | 6/2003 | Nielsen ....................... 455/436 |
| 6,580,910 B1 | * | 6/2003 | Mazur et al. ................ 455/440 |
| 2001/0041569 A1 | * | 11/2001 | Rahman ....................... 455/436 |

FOREIGN PATENT DOCUMENTS

| | | |
|---|---|---|
| WO | WO 99 14972 A | 3/1999 |
| WO | WO 99 51052 A | 10/1999 |
| WO | WO 00 35226 A | 6/2000 |

* cited by examiner

Primary Examiner—William Trost
Assistant Examiner—James Ewart
(74) Attorney, Agent, or Firm—Gibbons, Del Deo, Dolan, Griffinger & Vecchione

(57) ABSTRACT

One of a plurality of base stations is selected by a network entity, such as a mobile control point, for communicating with a respective remote station. Transmission channel quality information associated with at least two of the base stations is received at predefined intervals. Loading information associated with the base stations is received at further predefined intervals. A respective one of the base stations is selected as a function of the quality information and the loading information. An indication that the respective remote station is to commence communication with the selected one of the at least two base stations is sent to the respective remote station.

28 Claims, 2 Drawing Sheets

NETWORK DRIVEN CELL SWITCHING AND HANDOFF WITH LOAD BALANCING FOR WIRELESS SYSTEMS

BACKGROUND OF THE INVENTION

The present invention is directed to communication via a wireless connection and, more particularly, to wireless communication capable of carrying voice and/or data signals at high data rates.

Recent wireless communication systems, such as cellular systems that use code division multiple access (CDMA) technology, often employ a "soft handoff" where, at any given time, a mobile station communicates with the network via more than one base transceiver station (BTS). The soft handoff ensures that the mobile station communicates continuously with the network while the mobile station moves across cell regions covered by respective BTSs.

Soft handoff systems, however, are prone to having the transmissions from one BTS interfere with those from another BTS. Also, when such systems are used to transfer data packets, complex scheduling of the routing of the packets is required which often delays the movement of the packets.

To reduce interference and improve the packet transfer speed, cell switching may be employed instead of a soft handoff. In cell switching, only the BTS having the best transmission channel quality is selected to transmit to the mobile station. The mobile station periodically measures the channel quality of each BTS in its active set, typically by measuring the carrier to interference ratio (C/I) of each BTS. When a mobile station that is receiving forward link transmissions from one BTS enters a region where it can receive transmissions from more than one BTS, or when the mobile station that is receiving forward link transmissions from the BTS experiences a reduction in forward link transmission quality because of fading, shadowing or signal path loss, the mobile station then determines which BTS is transmitting at the highest channel quality and sends an indication of the desired BTS, namely the BTS transmitting at the highest channel quality, to each BTS in the active set.

Because the switching from one BTS to another is based solely on the channel quality, a mobile station may be switched from one BTS to another BTS in its active set that is already heavily loaded. As a result, the traffic load is unevenly distributed among the BTSs which results in traffic congestion and transmission delays that degrade the quality of service for some or all of the mobile stations that are served by the heavily loaded BTS.

It is therefore desirable that the mobile stations be switched from one BTS to another in a manner that more evenly distributes the loading of the BTSs. It is further desirable that the switching be driven by a network-side entity so that the loading of the BTSs is centrally controlled.

SUMMARY OF THE INVENTION

The present invention provides for fast switching from one BTS to another that is network driven and that is based on the loading conditions of the BTSs that are in the active set as well as being based on the transmission channel quality of the BTSs.

A remote station measures the transmission channel quality associated with base stations in its active set, and the remote station sends the transmission channel quality information stations to a network entity, such as a mobile control point (MCP), at predefined intervals via its current base station. Loading information associated with the base stations is reported to the network entity by the base stations. The network entity selects a respective one of the base stations based on a function of the transmission channel quality information reported by the remote station and the loading information of the base stations. The network entity sends the remote station an indication that it is to commence communication with the selected base station.

In accordance with an aspect of the invention, one of a plurality of base stations is selected by a network entity for communicating with a respective remote station. Transmission channel quality information associated with at least two of the base stations is received at predefined intervals. Loading information associated with the base stations is received at further predefined intervals. A respective one of the base stations is selected as a function of the quality information and the loading information. An indication that the respective remote station is to commence communication with the selected one of the at least two base stations is sent to the respective remote station.

Other features and advantages of the present invention will become apparent from the following detailed description of the invention with reference to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
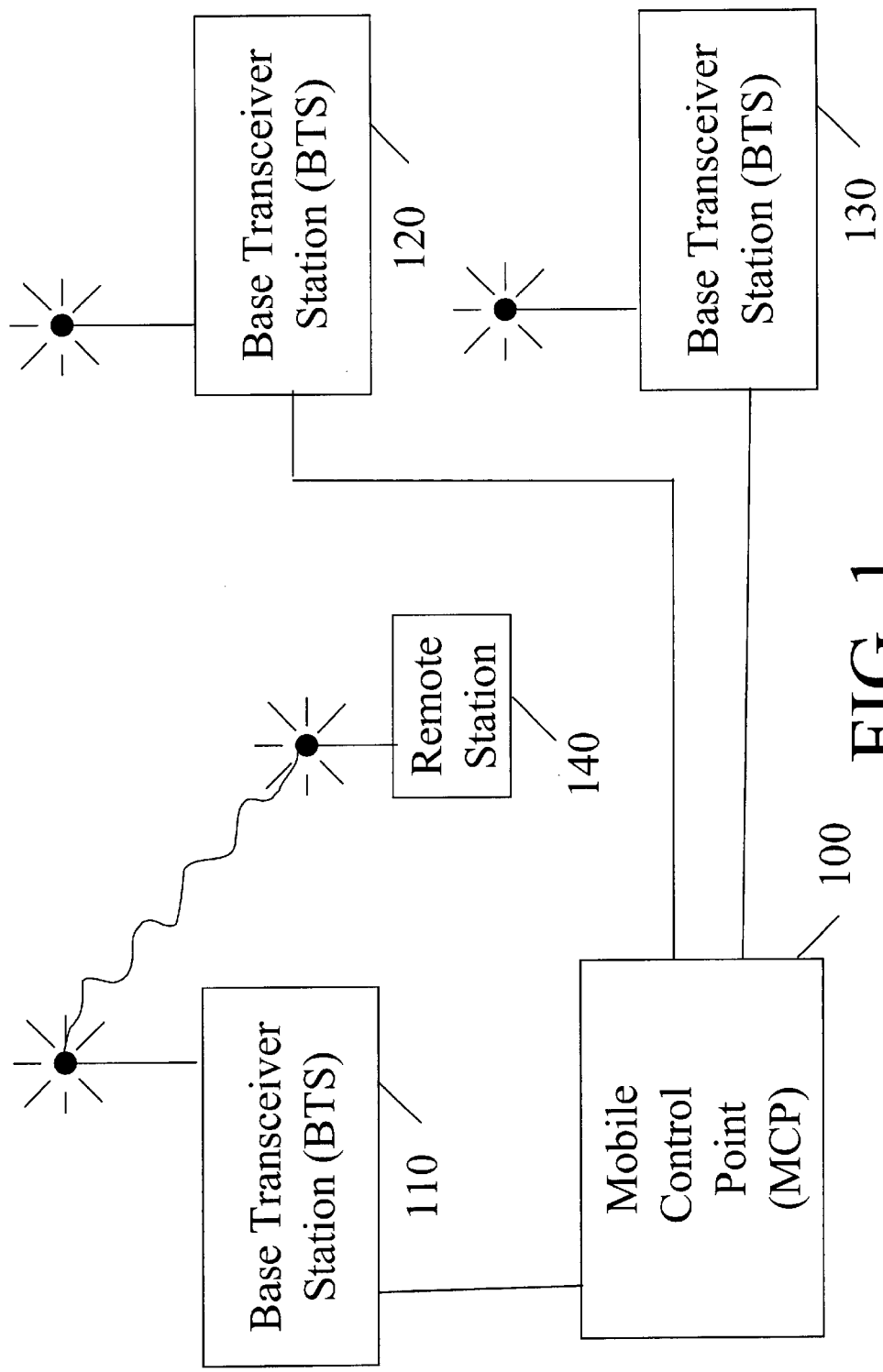
FIG. 1 is a block diagram showing an example of a wireless communication arrangement in which a remote station communicates with one of a plurality of base transceiver stations under the control of a mobile control point.

FIG. 1 illustrates an example of a cellular, wireless communication arrangement for providing voice and/or data services, such as packet data services, to a remote station. A plurality of base transceiver stations (BTS) 110, 120, 130, . . . are each assigned to respective geographic regions, known as cells.

A remote station 140 communicates with one of the BTS 110 of its active set, i.e. the set of nearby BTSs whose forward link transmissions could be received by the remote station. The remote station may be a mobile station (MS), such as cellular telephone or other wireless telephone, a personal digital assistant (PDA) or other handheld or pocket device, or another wireless device. Alternatively, the remote station may be a fixed location wireless device.

A mobile control point (MCP) 100 or other network-side control device directs each voice and/or data connection to a respective BTS via a cable connection. The BTS, in turn, provides a wireless link for the voice and/or data connection to the remote station. The MCP may also send control information to the remote station and receive control information from the remote station via the BTS using, for example, inband signaling.

When a remote station is located within the transmission range of more than one BTS, namely when the remote station is situated in a region where two or more cells overlap, the MCP may determine which of the BTSs communicates with the remote station.

Figure 2:
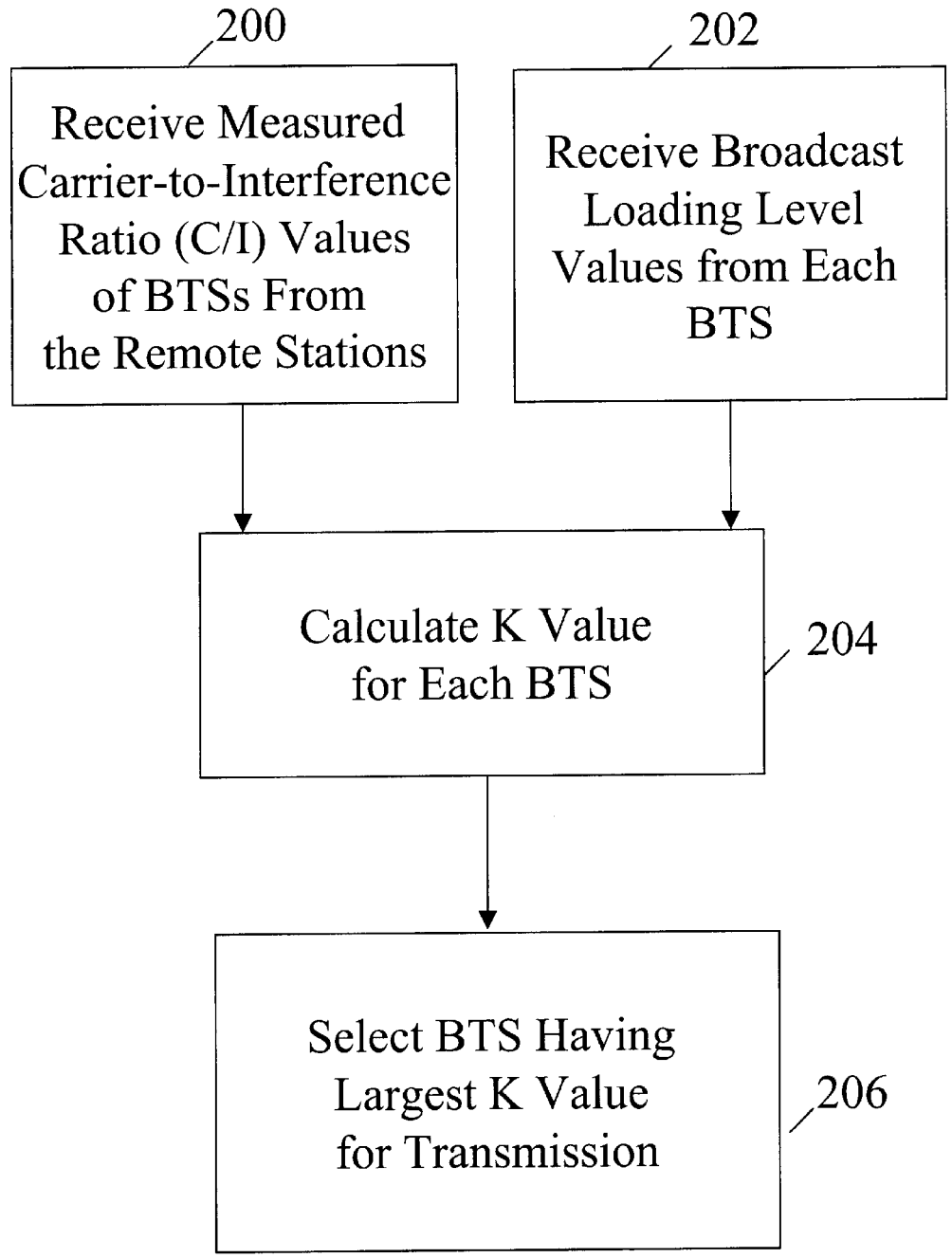
FIG. 2 is a flow chart illustrating a sequence of operations for selecting one of a plurality of base transceiver stations in accordance with the invention.

FIG. 2 illustrates an example of a method, according to the invention, by which the MCP selects which BTS is to communicate with a remote station. As step 200 shows, each remote station periodically measures the channel quality of one or more of the BTSs in its active set. The remote station periodically transmits the channel quality information to the BTS that is presently receiving its signal which, in turn, delivers the information to the MCP.

Typically, the transmission channel quality of each BTS is determined by the carrier to interference ratio (C/I) of the forward link transmission channel as received at the remote station. The C/I is defined as the ratio of the energy of the modulation carrier signal received from the BTS, integrated over time, to the energy of all other received signals that are on the same frequency band, integrated over time. However, other indications of the transmission channel quality may alternatively be used.

The C/I of the BTS may be based on a single value determined by integrating over the duration of one or more time slots that are each of a duration of, typically, 1.25 ms. Alternatively, the C/I may be based on plural values that are each determined by integrating over the duration of one or more time slots and then averaging the values and/or eliminating anomalous values. The choice of method may be based on the conditions at the locations of the BTSs.

Each BTS also periodically determines its forward link loading condition L and delivers the loading condition information to the MCP, as step 202 shows. The forward link loading condition L of the BTS is typically determined by the number of packets that are stored in its buffer and that are awaiting transmission, though other loading indicators may be used. The forward link loading condition L may be determined with every time slot or at intervals of two or more time slots.

Then, as shown at step 204, the MCP periodically determines a value K for each BTS that is a function of both the C/I and the forward link loading condition L. The value K for each BTS is typically based on the relation:

$$K_i \propto \frac{f_1(C/I)_i}{f_2(L_i)},$$

where i is the index of a respective BTS, and $f_1$ and $f_2$ are functions.

The MCP then selects the BTS having the greatest K value, as step 206 shows, and signals the remote station, such as by using inband signaling, to terminate communication with its current BTS, if any, and initiate communication with the selected BTS at a specific time slot. The MCP also informs the current BTS and the selected BTS of the switch, typically using inter-BTS signaling.

Thus, the MCP determines which BTS is to communicate with the remote station not only based on the channel quality of the BTS but also based on the loading condition of the BTS. As a result, the remote station is less likely to be switched to a heavily loaded cell, thereby reducing network congestion and signal delay and avoiding degradation of the quality of service.

Also, the switching from one BTS to another is driven by the MCP so that the control of the loading of the BTSs is centralized in a network-side entity, rather than being distributed among the remote stations.

Although the present invention has been described in relation to particular embodiments thereof, many other variations and modifications and other uses may become apparent to those skilled in the art. It is preferred, therefore, that the present invention be limited not by this specific disclosure herein, but only by the appended claims.

What is claimed is:

1. A method of selecting one of a plurality of base stations for communicating with a respective remote station, said method comprising the steps of:

receiving, at predefined intervals, transmission channel quality information associated with at least two of said plurality of base stations;

receiving, at further predefined intervals, loading information associated with said at least two base stations;

selecting a respective one of said at least two base stations as a function of said quality information and said loading information; and sending, to said respective remote station, an indication that said respective remote station is to commence communication with said selected one of said at least two base stations, said selecting step including selecting said respective one of said at least two base stations having a greatest k value, wherein said k value is defined by the relation:

$$K_i \propto \frac{f_1(C/I)_i}{f_2(L_i)},$$

wherein i is a respective index associated with a particular one of said at least two base stations, $f_1$ and $f_2$ are functions, $(C/I)_i$ is a carrier to interference ratio (C/I) of a forward link transmission channel associated with said particular base station, and $i_i$ is a function of number of packets that are stored in a buffer of said particular base station.

2. The method of claim 1 wherein said receiving transmission channel quality information step includes receiving said transmission channel quality information from said remote station.

3. The method of claim 2 wherein said remote station comprises at least one of: a mobile station (ms) and a stationary wireless station.

4. The method of claim 3 wherein said mobile station comprises at least one of: a cellular telephone, a wireless telephone, a personal digital assistant (pda), a handheld wireless communication device, and a pocket sized wireless communication device.

5. The method of claim 1 wherein said predefined intervals each comprise at least one time slot interval.

6. The method of claim 1 wherein said quality information associated with a particular one of said at least two base stations comprises a carrier to interference ratio (c/i) of a forward link transmission channel for said particular base station.

7. The method of claim 1 wherein said receiving loading information step includes receiving said loading information from said at least two base transceiver stations (bts).

8. The method of claim 1 wherein said further predefined intervals each comprise at least one time slot interval.

9. The method of claim 1 wherein said loading information associated with a particular one of said at least two base stations is a function of a number of packets that are stored in a buffer of said particular base station.

10. The method of claim 1 wherein said respective one of said at least two base stations has a greatest ratio of transmission channel quality information associated therewith to loading information associated therewith.

11. The method of claim 1 wherein said functions $f_1$ and $f_2$ are linear functions.

12. The method of claim 1 wherein said sending step includes sending, to said respective remote station, an indication that said respective remote station is to terminate communication with a further one of said at least two base stations that is currently communicating with said respective remote station.

13. The method of claim 1 further comprising the step of sending, to said selected base station, an indication that said selected base station is to commence communication with said respective remote station.

14. The method of claim 1 further comprising the step of sending, to a further one of said at least two base stations that is currently communicating with said respective remote station, an indication that said further base station is to terminate communication with said respective remote station.

15. An apparatus of selecting one of a plurality of base stations for communicating with a respective remote station, said apparatus comprising:

means for receiving, at predefined intervals, transmission channel quality information associated with at least two of said plurality of base stations;

means for receiving, at further predefined intervals, loading information associated with said at least two base stations;

means for selecting a respective one of said at least two base stations as a function of said quality information and said loading information; and means for sending, to said respective remote station, an indication that said respective remote station is to commence communication with said selected one of said at least two base stations, said selecting means including means for selecting said respective one of said at least two base stations having a greatest k value, wherein said k value is defined by the relation:

$$K_i \propto \frac{f_1(C/I)_i}{f_2(L_i)},$$

wherein i is a respective index associated with a particular one of said at least two base stations, $f_1$ and $f_2$ are functions, $(C/I)_i$ is a carrier to interference ratio (C/I) of a forward link transmission channel associated with said particular base station, and $i_i$ is a function of number of packets that are stored in a buffer of said particular base station.

16. The apparatus of claim 15 wherein said receiving transmission channel quality information means includes means for receiving said transmission channel quality information from said remote station.

17. The apparatus of claim 16 wherein said remote station comprises at least one of: a mobile station (ms) and a stationary wireless station.

18. The apparatus of claim 17 wherein said mobile station comprises at least one of: a cellular telephone, a wireless telephone, a personal digital assistant (pda), a handheld wireless communication device, and a pocket sized wireless communication device.

19. The apparatus of claim 15 wherein said predefined intervals each comprise at least one time slot interval.

20. The apparatus of claim 15 wherein said quality information associated with a particular one of said at least two base stations comprises a carrier to interference ratio (c/i) of a forward link transmission channel for said particular base station.

21. The apparatus of claim 15 wherein said receiving loading information means includes means for receiving said loading information from said at least two base transceiver stations (bts).

22. The apparatus of claim 15 wherein said further predefined intervals each comprise at least one time slot interval.

23. The apparatus of claim 15 wherein said loading information associated with a particular one of said at least two base stations is a function of a number of packets that are stored in a buffer of said particular base station.

24. The apparatus of claim 15 wherein said respective one of said at least two base stations has a greatest ratio of transmission channel quality information associated therewith to loading information associated therewith.

25. The apparatus of claim 15 wherein said functions $f_1$ and $f_2$ are linear functions.

26. The apparatus of claim 15 wherein said sending means includes sending, to said respective remote station, an indication that said respective remote station is to terminate communication with a further one of said at least two base stations that is currently communicating with said respective remote station.

27. The apparatus of claim 15 further comprising means for sending, to said selected base station, an indication that said selected base station is to commence communication with said respective remote station.

28. The apparatus of claim 15 further comprising means for sending, to a further one of said at least two base stations that is currently communicating with said respective remote station, an indication that said further base station is to terminate communication with said respective remote station.

* * * * *